Figure 1:
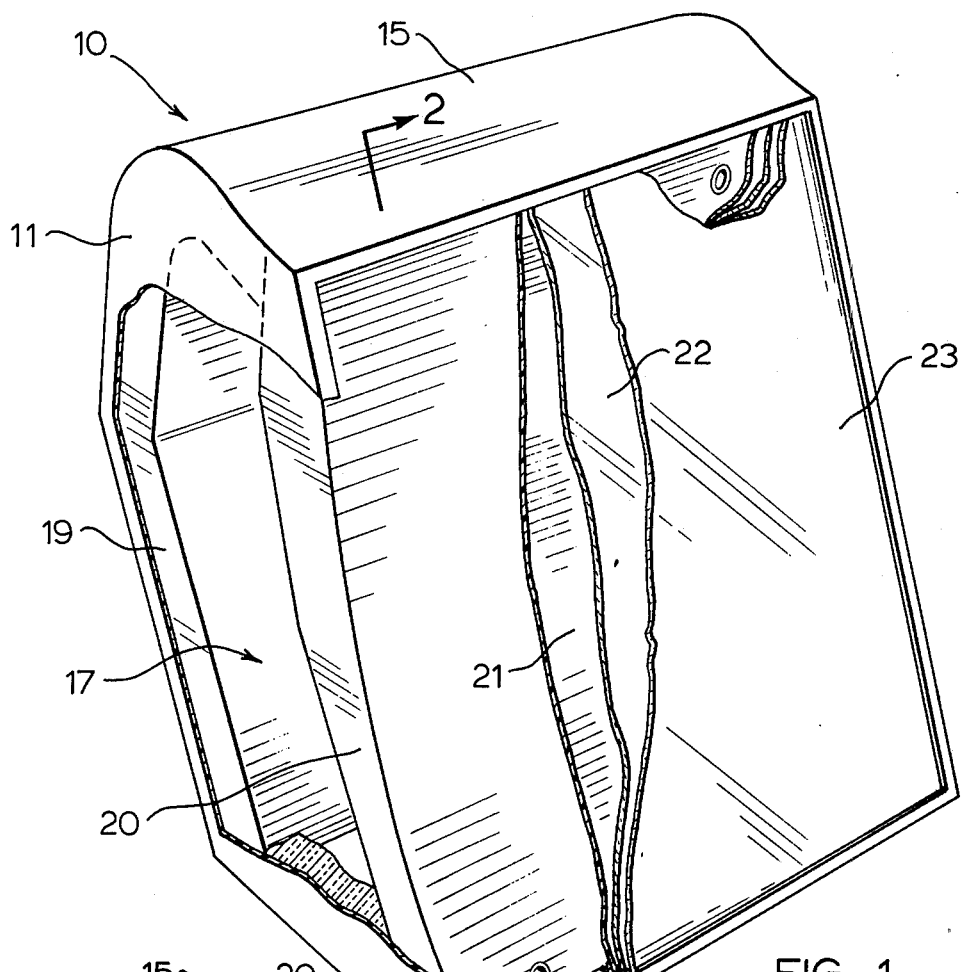

United States Patent [19]

Wikholm

[11] 4,003,367
[45] Jan. 18, 1977

[54] STORAGE TYPE SOLAR WATER HEATER

[76] Inventor: Ilmar Veikko Wikholm, R.R. 2, Whitby, Ontario, Canada

[22] Filed: Dec. 15, 1975

[21] Appl. No.: 640,426

[52] U.S. Cl. .............................. 126/271; 126/270; 165/106
[51] Int. Cl.² ............................................ F24J 3/02
[58] Field of Search .................. 126/270, 271, 400; 237/1 A; 165/106; 137/564

[56] References Cited

UNITED STATES PATENTS

| 433,055 | 7/1890 | Tellier | 126/270 |
|---|---|---|---|
| 966,070 | 8/1910 | Bailey | 126/271 |
| 3,220,470 | 11/1965 | Balch | 165/106 |
| 3,267,996 | 8/1966 | Valente | 165/106 |
| 3,390,672 | 7/1968 | Snelling | 126/271 |
| 3,901,036 | 8/1975 | Martin | 126/270 |
| 3,919,998 | 11/1975 | Parker | 237/1 A |
| 3,923,038 | 12/1975 | Cutchaw | 126/271 |

*Primary Examiner*—William R. Cline
*Assistant Examiner*—H. Jay Spiegel

[57] ABSTRACT

A solar water heater comprises a unitary housing structure providing a thermally insulated storage compartment and a heating, or collector, compartment of substantially smaller volume than the storage compartment. The two compartments are interconnected by first and second liquid flow passages extending through an insulating wall portion, forming a thermosiphon responsive to absorption of solar radiation by the collector; one of the liquid flow passages extends between an inlet communicating with the storage compartment in the lower portion thereof and an outlet communicating with the heating compartment in the lower portion thereof, the passage providing a first duct portion extending upwardly within the insulation of the frontal wall portion from the inlet, a second duct portion extending upwardly within the insulation of the frontal wall portion from the outlet, and an intermediate duct portion interconnecting the first and second duct portions. Conductive heat exchange means are provided between the intermediate duct portion of the liquid flow passage and the upper portion of the storage compartment for inhibiting reverse flow of liquid when the liquid in the heating compartment is cooler than the liquid in the storage compartment.

19 Claims, 2 Drawing Figures

U.S. Patent	Jan. 18, 1977	4,003,367

STORAGE TYPE SOLAR WATER HEATER

This invention relates to storage type solar water heaters.

A storage type solar water heater comprises essentially a collector which is heated directly by solar radiation, and a storage tank to which heat is conveyed from the collector by forced or natural circulation of a heat exchange liquid, commonly water. Such heaters are widely used in certain hot regions of the world that receive considerable quantities of sunshine, and are used primarily for obtaining low grade heat for domestic use or for use in hotels and hospitals. The heated water may be drawn directly from the storage tank, or the water to be heated may be passed through a tubular heat exchanger mounted in the storage tank and so heated indirectly.

Solar water heaters which rely upon forced circulation of liquid employ a pump and a differential temperature-responsive control system for controlling the pump operation. Such units have the important advantage that they are convenient to install, but they are very costly, frequently inefficient, and tend to be unreliable in operation. Solar water heaters which rely upon natural circulation are generally inconvenient to install, since the storage tank must be placed at a higher level than the collector; hitherto it has not been feasible to place the collector and storage tank adjacent one another at the same height, for although such an arrangement would operate efficiently in the daytime, it would operate in reverse at night when the stored heat would be reradiated into the atmosphere.

The present invention relates specifically to a compact, unitary heater construction which relies on natural circulation of the heat exchange liquid, and in which reverse flow of liquid at night is prevented.

A solar water heater in accordance with the invention comprises a unitary housing structure providing a liquid-tight storage compartment and a liquid-tight heating, or collector, compartment of substantially smaller volume than the storage compartment, the housing structure providing a thermally insulating enclosure for the storage compartment, which enclosure includes a frontal wall portion separating the compartments. The two compartments are interconnected by first and second liquid flow passages extending through the frontal wall portion of the insulating enclosure, forming therewith a thermosiphon responsive to absorption of solar radiation by the collector; one of the liquid flow passages extends between an inlet communicating with the storage compartment in the lower portion thereof and an outlet communicating with the heating compartment in the lower portion thereof, the passage providing a first duct portion extending upwardly within the insulation of the frontal wall portion from the inlet, a second duct portion extending upwardly within the insulation of the frontal wall portion from the outlet, and an intermediate duct portion interconnecting the first and second duct portions. Heating means communicating with the intermediate duct portion of the liquid flow passage are provided for inhibiting reverse flow of liquid when the liquid in the heating compartment is cooler than the liquid in the storage compartment. The heating means may be a conductive heat exchanger extending between the intermediate portion of the liquid flow passage and the upper portion of the storage compartment. The conductive heat exchange means may be constituted by a metallic tube, for example a copper tube, lining the first liquid flow passage, or at least the intermediate duct portion thereof, a portion of the tube extending into the storage compartment. Alternatively, the heating means may simply be an electric heating element in said intermediate portion controlled thermostatically or by a timer.

Heated water may be drawn directly from the storage compartment in the conventional manner. Alternatively, and preferably, a tubular heat exchanger may be mounted in the storage compartment, the heat exchanger providing water flow connections for the passage of water to be heated therein.

Figure 2:
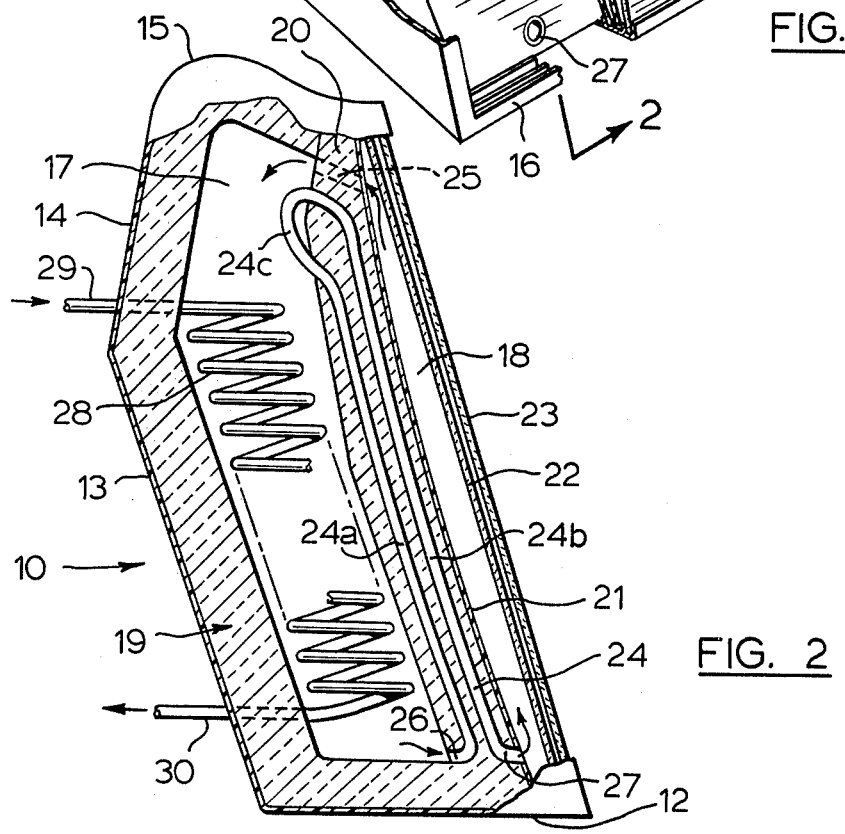

In order that the invention may be readily understood, one embodiment thereof will now be described by way of example with reference to the accompanying drawings, in which:

FIG. 1 is a perspective view of a storage type solar water heater in accordance with the invention, parts of the external structure being broken away to show internal structure; and FIG. 2 is a sectional elevation of the heater taken on line II—II in FIG. 1.

Referring to the drawings, the solar water heater is of unitary construction, and comprises a unitary housing structure 10 having a rigid outer casing 11 of glass fiber reinforced synthetic resin. The casing 11 forms a flat base 12, a rear wall 13 which slopes upwardly and rearwardly from the base, and having a forwardly inclined upper portion 14 which merges with the top 15 of the casing. The base, top and side walls of the casing terminate in a longitudinally ribbed flange 16 which defines a rectangular opening at the front of the casing.

The housing structure 10 provides a liquid-tight interior storage compartment 17, and a liquid-tight interior heating compartment 18, which is of substantially smaller volume than the storage compartment. The storage compartment 17 is totally enclosed by a thermally insulating enclosure 19 of polyurethane, the latter being internally lined, for example by a glass fiber reinforced synthetic resin, to prevent seepage of water from the storage compartment into the insulation. The thermally insulating enclosure 19 lines the whole of the interior of the casing 11, and includes a frontal wall portion 20 which slopes upwardly and rearwardly with respect to the base 12. The exterior surface 21 of the frontal wall portion 20 is also lined with a glass fiber reinforced synthetic resin, and is blackened or otherwise treated so as to make it non-reflective to solar radiation, this surface providing the heat absorption element of the collector of the heater.

Two rectangular transparent panels 22, 23, which may be of glass or plastic, are retained by the flange 16 and peripherally sealed to the frontal portion of the housing 10 to form a window which is transparent to solar radiation. The two panels are spaced apart to provide an intermediate air space, the interior panel 22 being spaced forwardly from the non-reflective surface 21 so as to define the heating compartment 18 which is confined between them. The window slopes upwardly and rearwardly with respect to the base, at an angle suitable for the latitude in which the heater is used, so as to transmit the maximum solar radiation when the heater is facing southwards. It is important that the window panels 22, 23 should be of a material which is not only transparent to solar radiation, but has a higher transparency to solar radiation than to infra red radiation which is reradiated from the collector surface 21, glass being the most convenient material for this purpose.

Alternatively, the interior panel 22 may be of a thermally conductive material, such as copper, having a non-reflective exterior face.

The storage compartment 17 and heating compartment 18 are interconnected by a first liquid flow passage 24 and a second liquid flow passage 25. The passage 24 comprises a copper tube which is shaped to provide a first duct portion 24a extending upwardly within the insulation of the wall portion 20 from an inlet 26 communicating with the lower portion of the compartment 17, a second duct portion 24b extending upwardly within the insulation from an outlet 27 communicating with the lower portion of the compartment 18, and an intermediate duct portion 24c, which is defined by a portion of the copper tube extending into the upper portion of the storage compartment 17. The second liquid flow passage 25 is a short passage extending rearwardly and upwardly through the frontal wall portion 20 between an inlet communicating with the upper portion of the heating compartment and an outlet communicating with the upper portion of the storage compartment. The passages 24, 25 form with the compartments 17, 18 a thermosiphon responsive to absorption of solar radiation transmitted via the window 22, 23 into the heating compartment, the absorbed heat being carried by convection into the storage compartment. Heated water may be drawn directly from the storage compartment. However, in the embodiment of the invention presently described, water to be heated is passed through a tubular heat exchanger 28 mounted in the storage compartment 17, the tubular heat exchanger providing a pair of external water flow connections 29, 30. It should be mentioned that the water must be heated indirectly by means of a heat exchanger in any system where the water supply pressure is greater than the housing structure would otherwise withstand.

The window formed by the panels 22, 23 need not slope rearwardly as illustrated, although this is the preferred arrangement. Other configurations would be possible if used in conjunction with means, such as reflectors for example, for directing solar radiation through the window. Similarly, the front wall portion 20 need not slope rearwardly as shown, although it is preferred that this should extend generally in the direction of the window. However, the important thing is that this frontal wall portion should extend generally upwards from the base so as to provide a configuration necessary for the operation of a thermosiphon.

In operation of the heater, solar radiation is transmitted through the window 22, 23 and is absorbed by the collector surface 21, the water in the heating compartment 18 being heated and caused to rise. Water from the heating compartment flows through the passage 25 into the upper portion of the storage compartment 18, cooler water being displaced from the bottom portion of the latter into the duct 24. Cooler water enters the lower portion of the heating compartment, and is in turn heated, a thermosiphon thus being started and continuing for as long as the heating receives direct solar radiation. At night, when there is a tendency for the coolector surface 21 to reradiate, the water in the heating compartment 18 falls to a lower temperature than the water in the storage compartment 17. This would normally cause a reverse flow of water, and consequent loss of stored heat. The purpose of the conductive heat exchanger constituted by the copper tube is to equalize the temperatures of the stored water and the water in the duct portion 24a. If this is achieved, reverse flow will be inhibited. Actually, since a heat exchanger will always have a loss, what happens is that the heat exchanger heats the upper portion of the duct portion 24a rapidly, when normal circulation stops, to a few degrees below the temperature in the top of the storage tank. A very slow reverse circulation will then start and displace the hot water slowly down the duct portion 24a, the colder water from duct portion 24b flowing slowly into the first duct portion and being heated. This process continues until all of the first duct portion is filled with hot water, a few degrees below the temperature in the top of the tank. At this point an equilibrium is reached and reverse circulation ceases.

It is apparent that the heat exchanger formed by the intermediate duct portion of the copper tube serves as an impedance to the flow of water to the heating compartment. It might therefore be thought that if the heat exchanger prevents reverse flow, it will also prevent forward circulation under normal operating conditions. This would be the case if in fact the rate of heating and rate of cooling of the collector surface were the same. However, since the transparent window and also the water contained in the heating compartment have a higher transparency to solar radiation than to the infra red radiation which is reradiated from the collector surface 21, the rate of cooling is less. In the alternative embodiment in which the interior panel is of opaque conductive material, the selective transmission of solar radiation by the panel 23 serves the same purpose.

A unit in accordance with the present invention is economical to construct, simple in operation and very convenient to instal. The unit can easily be filled via an expansion glass, not shown in the drawings. A number of such units can be placed side by side and operated in cascade, just one of the units having a tubular heat exchanger 28.

What I claim as my invention is:

1. A solar water heater comprising:
a unitary housing structure providing a liquid-filled thermal storage compartment and a liquid-filled heating compartment,
said housing structure providing a thermally insulating enclosure for said storage compartment, said thermally insulating enclosure including a base portion and a frontal wall portion extending upwardly therefrom,
a heat transmitting window peripherally sealed to said housing structure, the window being spaced from an exterior surface of said frontal wall portion and defining therewith said heating compartment, and
means defining a recirculation path for liquid extending downwardly through said storage compartment and upwardly through said heating compartment, said path defining means including:
means defining a first liquid flow passage extending through said frontal wall portion between a lower end of the portion of said circulation path extending through said storage compartment and a lower end of the portion of said circulation path extending through said heating compartment, said first liquid flow passage providing first and second duct portions extending upwardly within the insulation of the frontal wall portion from said lower ends, and an intermediate duct portion interconnecting said first and second duct portions, means defining a second liquid flow passage extending through said frontal wall portion between an upper end of the portion of said circulation path extending through said heating compartment and an upper end of the portion of said circulation path extending through said storage compartment, said recirculation path constituting a thermosiphon responsive to absorption of solar radiation transmitted via said window into the heating compartment, and heating means in thermal contact with said intermediate duct portion of the first liquid flow passage for inhibiting reverse flow of liquid when the liquid in the heating compartment is cooler than the liquid in the storage compartment.

2. A solar water heater according to claim 1, wherein said heating means comprises a conductive heat exchanger extending between intermediate duct portion and the upper portion of the storage compartment.

3. A solar water heater according to claim 2, wherein said means defining the first liquid flow passage comprises a metallic tube, said intermediate duct portion being defined by a portion of said tube extending into the storage compartment, said tube portion constituting said conductive heat exchanger.

4. A solar water heater according to claim 1, wherein said exterior surface of the frontal wall portion is non-reflective and said window is of a material having a higher transparency to solar radiation than to infra red radiation reradiated from said surface.

5. A solar water heater according to claim 4, wherein the window is of glass.

6. A solar water heater according to claim 4, wherein the window is formed by two transparent panels spaced apart and defining an air space therebetween, each panel being peripherally sealed to the housing structure.

7. A solar water heater according to claim 1, wherein the window is formed by two panels, namely an interior and an exterior panel, spaced apart and defining an air space therebetween, said panels being peripherally sealed to the housing structure, the interior panel being thermally conductive and having a non-reflective exterior face, and the exterior panel having a higher transparency to solar radiation than to infra red radiation reradiated from said exterior face.

8. A solar water heater according to claim 1, including means to separate said portion of said recirculation path through said storage compartment from a further circulation path for liquid through said storage compartment, said further path extending between external water flow connections to said storage compartment.

9. A solar water heater according to claim 8, wherein said separating means comprises a tubular heat exchanger mounted in said storage compartment, and extending between said external water flow connections.

10. A solar water heater comprising:

a unitary housing structure providing a horizontal base, said housing structure further providing a liquid-filled interior thermal storage compartment and a liquid-filled interior heating compartment, each said compartment having an upper portion and a lower portion, a thermally insulating enclosure for said storage compartment, said thermally insulating enclosure including a frontal wall portion sloping upwardly and rearwardly with respect to said base, a heat transmitting window peripherally sealed to said housing structure, the window being spaced forwardly from an exterior surface of said frontal wall portion and sloping upwardly and rearwardly with respect to the base, said heating compartment being confined between said exterior surface and said window, and means defining a recirculation path for liquid extending downwardly through said storage compartment and upwardly through said heating compartment, said path defining means including:

means defining a first liquid flow passage extending through the frontal wall portion between a lower end of the portion of said circulation path extending through said storage compartment and a lower end of the portion of said circulation path extending through said heating compartment, said first liquid flow passage providing first and second duct portions extending upwardly within the insulation of the frontal wall portion from said lower ends, and an intermediate duct portion interconnecting said first and second duct portions, means defining a second liquid flow passage extending rearwardly and upwardly through said frontal wall portion from the upper end of the portion of said circulation path extending through said heating compartment to the upper end of the portion of said circulation path extending through said storage compartment, said recirculation path constituting a thermosiphon responsive to absorption of solar radiation transmitted via the window into the heating compartment, and heating means in thermal contact with said intermediate duct portion of the first liquid flow passage for inhibiting reverse flow of liquid when the liquid in the heating compartment is cooler than the liquid in the storage compartment.

11. A solar water heater according to claim 10, wherein said heating means comprises a conductive heat exchanger extending between said intermediate duct portion and the upper portion of the storage compartment.

12. A solar water heater according to claim 11, wherein the exterior surface of the frontal wall portion is non-reflective and said window is of a material having a higher transparency to solar radiation than to infra red radiation reradiated from said surface.

13. A solar water heater according to claim 12, wherein the window is formed by two transparent panels spaced apart and defining an air space therebetween, each panel being peripherally sealed to the housing structure.

14. A solar water heater according to claim 11, wherein the window is of glass.

15. A solar water heater according to claim 11, wherein the window is formed by two panels, namely an interior and an exterior panel, spaced apart and defining an air space therebetween, said panels being peripherally sealed to the housing structure, the interior panel being thermally conductive and having a non-reflective exterior face, and the exterior panel having a higher transparency to solar radiation than to infra red radiation reradiated from said exterior face.

16. A solar water heater according to claim 11, wherein said means defining the first liquid flow passage comprises a metallic tube, said intermediate duct portion being defined by a portion of said tube extending into the storage compartment, said tube portion constituting said conductive heat exchanger.

17. A solar water heater according to claim 10, including means to separate said portion of said recirculation path through said storage compartment from a further circulation path for liquid through said storage compartment, said further path extending between external water flow connections to said storage compartment.

18. A solar water heater according to claim 17, wherein said separating means comprises a tubular heat exchanger mounted in the storage compartment, and extending between said external water flow connections.

19. A solar water heater according to claim 18, wherein the insulation of the thermally insulating enclosure is polyurethane, said storage and heating compartments being lined with glass fiber reinforced synthetic resin.

* * * * *